(12) United States Patent
Johnson

(10) Patent No.: US 11,211,629 B2
(45) Date of Patent: Dec. 28, 2021

(54) JOHNSON THERMO-ELECTROCHEMICAL CONVERTER

(71) Applicant: Johnson IP Holding, LLC, Atlanta, GA (US)

(72) Inventor: Lonnie G. Johnson, Atlanta, GA (US)

(73) Assignee: JOHNSON IP HOLDING, LLC, Atlanta, GA (US)

( * ) Notice: Subject to any disclaimer, the term of this patent is extended or adjusted under 35 U.S.C. 154(b) by 93 days.

(21) Appl. No.: 16/838,823

(22) Filed: Apr. 2, 2020

(65) Prior Publication Data

US 2020/0321643 A1 Oct. 8, 2020

Related U.S. Application Data

(60) Provisional application No. 62/829,128, filed on Apr. 4, 2019.

(51) Int. Cl.
| | |
|---|---|
| *H01M 8/18* | (2006.01) |
| *H01M 8/04029* | (2016.01) |
| *H01M 14/00* | (2006.01) |
| *H01M 8/04007* | (2016.01) |

(52) U.S. Cl.
CPC ....... *H01M 8/182* (2013.01); *H01M 8/04029* (2013.01); *H01M 8/04074* (2013.01); *H01M 14/00* (2013.01)

(58) Field of Classification Search
CPC ......... H01M 8/04029; H01M 8/04074; H01M 8/182
USPC .......................................................... 429/434
See application file for complete search history.

(56) References Cited

FOREIGN PATENT DOCUMENTS

WO WO-2018053474 A1 * 3/2018 ............ H01M 8/182

* cited by examiner

*Primary Examiner* — James M Erwin
(74) *Attorney, Agent, or Firm* — Panitch Schwarze Belisario & Nadel LLP

(57) ABSTRACT

A converter includes a working fluid, a housing, a heat sink, a heat source that is at an elevated temperature relative to the heat sink, a first electrochemical cell disposed within the housing, and a micro/nano porous media disposed within the housing. The first electrochemical cell includes a first membrane electrode assembly across which the working fluid is configured to flow. The first membrane electrode assembly includes a first porous electrode and a second porous electrode and at least one ion conductive membrane sandwiched between the first and second porous electrodes. The first electrochemical cell is arranged between the heat source and the heat sink. The working fluid is contained within the micro/nano porous media. The micro/nano porous media is thermally coupled between the heat source and the heat sink, and creates a pressure differential across the first electrochemical cell by transpiration pumping of the working fluid.

10 Claims, 11 Drawing Sheets

*Fig. 4 – Prior Art*

JOHNSON THERMO-ELECTROCHEMICAL CONVERTER

CROSS-REFERENCE TO RELATED APPLICATIONS

This application claims priority to U.S. Provisional Patent Application No. 62/829,128, filed Apr. 4, 2019, entitled "Johnson Thermo-Electrochemical Converter," the entire disclosure of which is incorporated by reference herein.

BACKGROUND OF THE INVENTION

The conversion of heat energy or chemical energy to electrical energy, or vice-versa, may be accomplished in a variety of ways. For example, known electrochemical cells or batteries rely on chemical reactions wherein ions and electrons of a reactant being oxidized are transferred to the reactant being reduced via separate paths. Specifically, the electrons are transferred electrically via wiring through an external load where they perform work and the ions are conducted through an electrolyte separator.

However, battery type electrochemical cells can produce only a limited amount of energy because the confines of the battery casing limit the amount of available reactants that may be contained therein. Although such cells can be designed to be recharged by applying a reverse polarity current/voltage across the electrodes, such recharging requires a separate electrical source. Also, during the recharging process, the cell is typically not usable.

Fuel cells have been developed in an effort to overcome problems associated with battery type electrochemical cells. In conventional fuel cells, the chemical reactants are continuously supplied to the electrochemical cell and reaction products are continuously removed. In a manner similar to batteries, fuel cells operate by conducting an ionized species through a selective electrolyte which generally blocks passage of electrons and non-ionized species, the electrons having to pass externally through an electrical load to complete the reaction.

The most common type of fuel cell is a proton conductive membrane (PEM) hydrogen-oxygen fuel cell which passes hydrogen through one of the electrodes and oxygen through the other electrode. The hydrogen ions are conducted through a proton conductive electrolyte separator to the oxygen side of the cell under the voltage potential of the hydrogen-oxygen chemical reaction. Porous electrodes on either side of the electrolyte separator are used to couple the electrons involved in the chemical reaction through an external load via an external circuit. The electrons and hydrogen ions reconstitute hydrogen in a reaction with oxygen on the oxygen side of the cell for the production of water which is expelled from the system. A continuous electrical current is maintained by a continuous supply of hydrogen and oxygen to the cell.

Mechanical heat engines have also been designed and used to produce electrical power. Such mechanical heat engines operate on thermodynamic cycles wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A key to the operation of all engines employing a working fluid is that less work is required to compress the working fluid at low temperatures than that produced by expanding it at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low-temperature ambient air is compressed by a piston and then heated to very high temperatures via fuel combustion inside the cylinder. As the cycle continues, the expansion of the heated air against the piston produces more work than that consumed during the lower temperature compression part of the cycle.

The Stirling engine has been developed to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermo-Electrochemical Conversion (AMTEC) cells have been designed as a thermo-electrochemical heat engine. AMTEC heat engines utilize pressure to generate a voltage potential and electrical current by forcing an ionizable working fluid, such as sodium, through an electrochemical cell at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for* 100 *t/d garbage disposal power generating facility*, Qiuya Ni et al. (Chinese Academy of Sciences, Inst. of Electrical Engineering, Beijing, China). Another representative publication is *Intersociety Energy Conversion Engineering Conference and Exhibit* (IECEC), 35th, Las Vegas, Nev. (Jul. 24-28, 2000), Collection of Technical Papers. Vol. 2 (A00-37701 10-44). Also see American Institute of Aeronautics and Astronautics, 190, p. 1295-1299. REPORT NUMBER(S)-AIAA Paper 2000-3032.

The heat rejected during cooling and re-condensation of the high temperature expanded gas leaving the electrode at low pressure represents a significant source of entropy loss and therefore AMTEC heat engine inefficiency. AMTEC engines also suffer from reliability issues due to the highly corrosive nature of the alkali metal working fluid. They also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature, because the alkali metal working fluid must remain above its melt temperature at all times as it moves through the cycle. Mechanical pumps, wicks and even magneto-hydrodynamic pumps have been used to pressurize the low-temperature working fluid.

In an effort to overcome the above-described drawbacks of conventional mechanical and thermo-electrochemical heat engines, the Johnson Thermo-Electrochemical Converter (JTEC) system was developed, as disclosed in U.S. Pat. No. 7,160,639 filed Apr. 28, 2003, International Patent Application No. PCT/US2015/044435 filed Aug. 10, 2015, and International Patent Application No. PCT/US2016/21508 filed Mar. 9, 2016, the entire contents of all three documents being incorporated herein by reference.

A more recent development of the JTEC relates to an electrochemical direct JTEC having membrane electrode assemblies and a control circuit operate to maintain a constant prescribed pressure ratio within the converter. More particularly, extra hydrogen is pumped to the high pressure side of the converter, and the additional pumped hydrogen compensates for the normal pressure loss due to molecular hydrogen diffusion through the membranes of the membrane electrode assembly stacks. Diffusion of molecular hydrogen through the separator membrane represents a significant decrease in power density over time, because the diffusion reduces the pressure differential across the electrodes of the membrane electrode assemblies and thereby reduces output voltage. Diffusion of molecular hydrogen also causes a reduction in efficiency, since this diffusion from high pressure to low pressure occurs without the diffusing hydrogen molecules undergoing an electrochemical reaction to produce electrical power. The membrane electrode assemblies and control circuit therefore operate to maintain a constant prescribed pressure ratio within the converter.

A common challenge for the JTEC is the need for large membrane electrode assembly surface areas, because high levels of current are required to complement the small voltage levels available per each membrane electrode assembly, if useful levels of power are to be achieved. The need therefore remains for a JTEC that provides improved efficiency and power density per membrane electrode assembly pair.

BRIEF SUMMARY OF THE INVENTION

Embodiments of the present invention provide an improvement over a typical JTEC system. More particularly, embodiments of the present invention include features to promote transpiration pumping to achieve higher voltage output per membrane electrode assembly pair as compared with a conventional JTEC engine.

In one embodiment, the invention relates to an electrochemical direct heat to electricity converter comprising a working fluid; a housing; a heat source and a heat sink, the heat source being at an elevated temperature above a temperature of the heat sink; a first electrochemical cell disposed within the housing and comprising a first membrane electrode assembly across which the working fluid is configured to flow, the first membrane electrode assembly of the first electrochemical cell including a first porous electrode and a second porous electrode and at least one ion conductive membrane sandwiched between the first and second porous electrodes, the first electrochemical cell being arranged between the heat source and the heat sink; and a micro/nano porous media disposed within the housing, the working fluid being contained within the micro/nano porous media, the micro/nano porous media being thermally coupled between the heat source and the heat sink and creating a pressure differential across the first electrochemical cell by transpiration pumping of the working fluid.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

Figure 1:
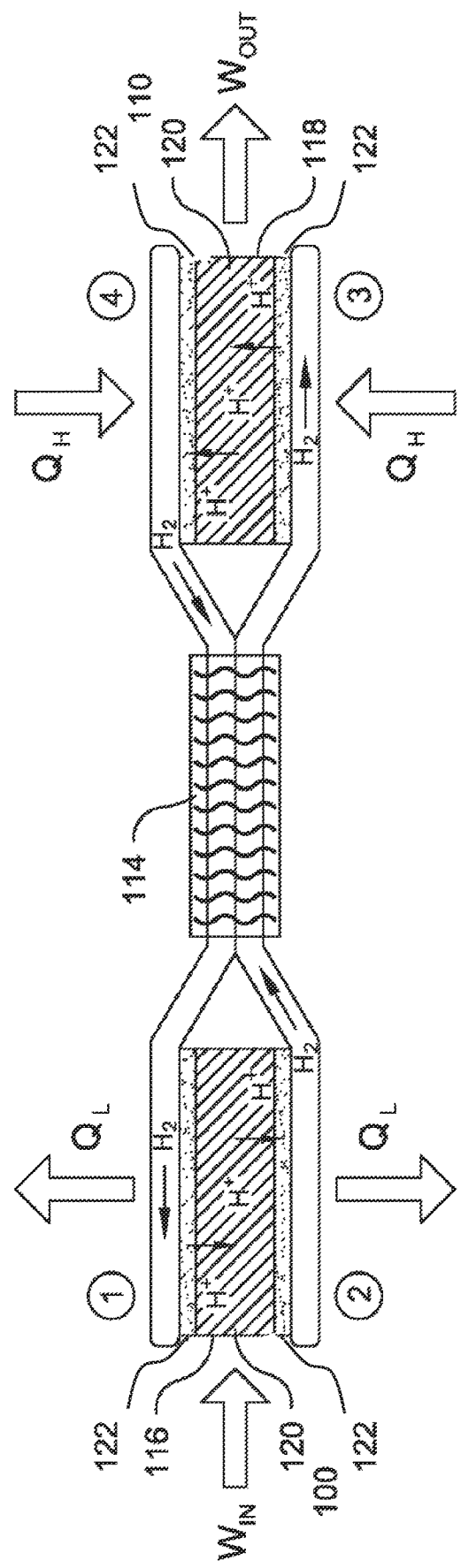
FIG. 1 is a diagram of a Johnson Thermo-Electrochemical Converter including two membrane electrode assemblies connected back to back by a recuperative heat exchanger.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched. Also, MEA cell array and MEA cell stack may be used interchangeably Referring to FIG. 1, there is shown a typical JTEC system (electrical connections not shown). JTEC is a heat engine that includes a first electrochemical cell 100 operating at a lower temperature, a second electrochemical cell 110 operating at a higher temperature relative to each other, a conduit system 112 including a heat exchanger 114 that couples the two cells 100, 110 together, and a supply of ionizable gas (such as hydrogen, oxygen or alkali metal) as a working fluid contained within the conduit system 112. Preferably, the working fluid is hydrogen. Each electrochemical cell 100, 110 includes one or more membrane electrode assemblies.

More particularly, the first electrochemical cell 100 includes a first membrane electrode assembly (MEA) 116 coupled to a low temperature heat sink $Q_L$ (i.e., the first MEA 116 is a low temperature MEA and the first cell 100 represents a low temperature side of the converter), the second electrochemical cell 110 includes a second MEA 118 coupled to a high temperature heat source $Q_H$ (i.e., the second MEA 118 is a high temperature MEA and the second cell 110 represents a high temperature side of the converter), and a recuperative heat exchanger 114 connects the two MEAs 116, 118. Each MEA 116, 118 includes a non-porous membrane 120 capable of conducting ions of the working fluid and porous electrodes 122 positioned on opposite sides of the non-porous membrane 120 that are capable of conducting electrons.

The membranes 120 are preferably ion conductive membranes or proton conductive membranes. The membranes 120 preferably have a thickness on the order of approximately 0.1 µm to 500 µm, and more preferably between approximately 1 µm and 500 µm. More particularly, the membranes 120 are preferably made from a proton conductive material, and more preferably a polymer proton conductive material or a ceramic proton conductive material. The membranes 120 of the MEAs 116, 118 of the JTEC are not necessarily made of the same material. The material selected for a given MEA will depend on its intended operating temperature. In one embodiment, the membranes 120 are preferably formed of a material comprising a compound represented by the general formula $Na_xAl_yTi^{3+}_{x-y}Ti^{4+}_{8-x}O_{16}$, as disclosed in U.S. Pat. No. 4,927,793 of Hori et al., which is incorporated herein by reference, since this material exhibits high proton conductivity over a broad temperature range. However, it will be understood by those skilled in the art that any material, and preferably any polymer or ceramic material, which demonstrates a suitable proton conductivity over a desired temperature range may be used to form the membranes 120. For example, in an alternate embodiment, the membranes 120 are formed of hydronium beta" alumina.

The electrodes 122 of each MEA 116, 118 are preferably thin electrodes having a thickness on the order of approximately 0.1 µm to 1 cm, and more preferably approximately 10 µm. The use of different materials for the various components of each MEA 116, 118 (i.e., the electrodes 122 and the membranes 120) could result in very high thermal stresses due to differences in the thermal expansion coefficients between the materials. Accordingly, the electrodes 122 of an MEA are preferably comprised or formed of the same material as the membranes 120. However, the electrodes 122 are preferably porous structures, while the membranes 120 are preferably non-porous structures. Also, it will be understood that the electrodes 122 and the membranes 120 may be formed of different materials having similar thermal expansion coefficients.

In one embodiment, the porous electrodes 122 may be doped or infused with additional material(s) to provide electronic conductivity and catalytic material, in order to promote oxidation and reduction of the working fluid.

On both the low temperature side 100 and high temperature side 110 of the converter, there may be present arrays or stacks of MEAs. 116, 118 The MEAs 116, 118 may be connected, for example, in series to achieve higher overall output voltage, or in parallel to achieve higher overall output current.

Figure 2:
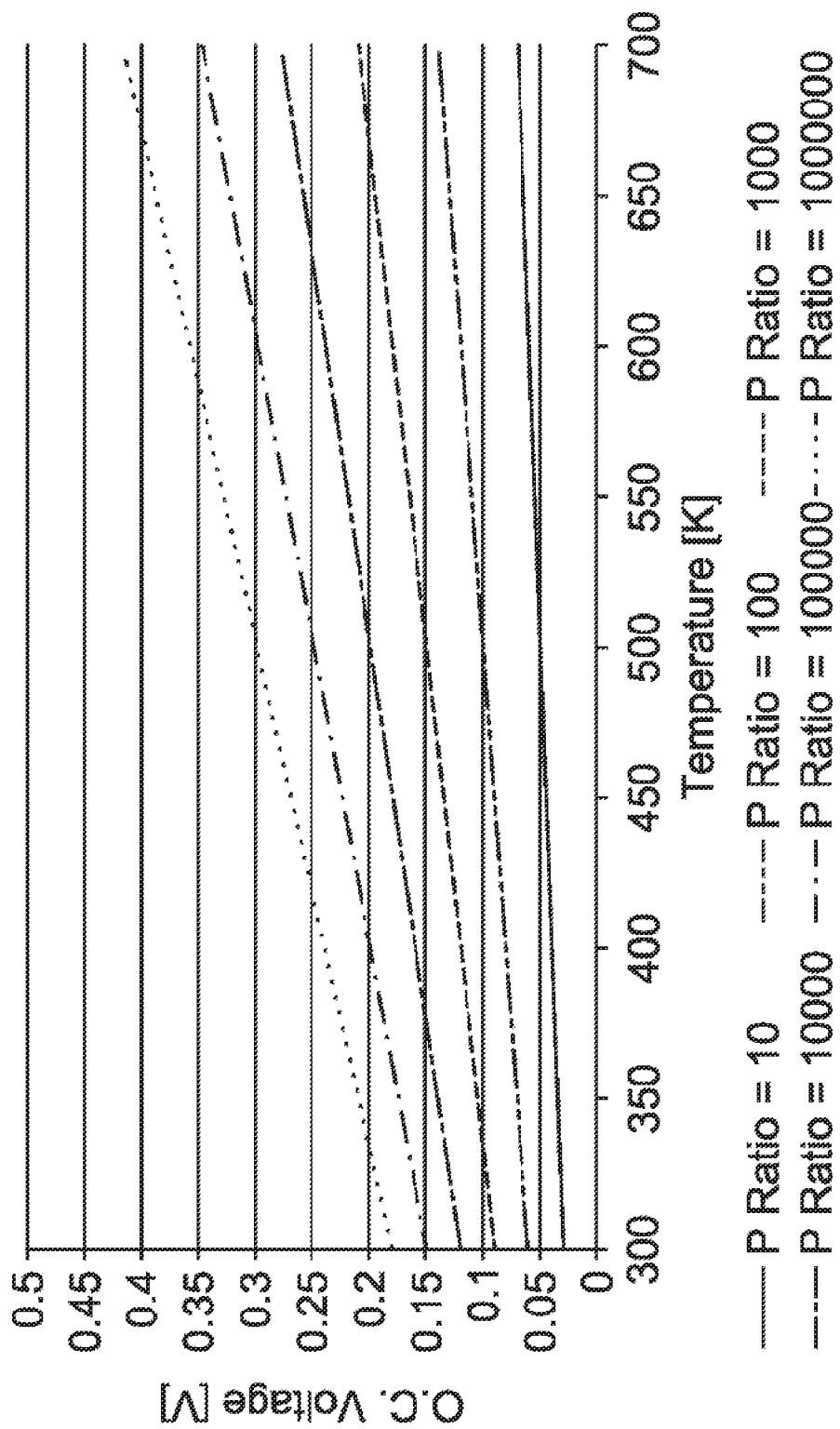
FIG. 2 is a plot of Nernst voltage versus temperature for several pressure ratios.

The electrical potential due to the ionizable gas (i.e., the working fluid) pressure differential across a MEA is proportional to the natural logarithm of the pressure ratio, and can be calculated using the Nernst equation:

$$V_{OC} = \frac{RT}{2F}\ln(P_H/P_L), \qquad \text{Equation 1}$$

where $V_{OC}$ is open circuit voltage, R is the universal gas constant, T is the cell temperature, F is Faraday's constant, $P_H$ is the pressure on the high pressure side, $P_L$ is the pressure on the low pressure side, and $P_H/P_L$ is the pressure ratio. E.g., *Fuel Cell Handbook*, J. H. Hirschenhofer et al., 4th Edition, p. 2-5 (1999). The voltage is linear with respect to temperature and is a logarithmic function of the pressure ratio. FIG. 2 is a plot of the Nernst equation for hydrogen and shows the voltage vs. temperature relationship for several pressure ratios. For example, referring to FIG. 2, at a pressure ratio of 10,000, when the temperature is relatively high, the voltage is similarly relatively high and when the temperature is relatively low, the voltage is similarly relatively low. Thus, the voltage of a higher temperature MEA 118 will be higher than the voltage of a lower temperature MEA 116 under the same pressure differential.

Figure 3:
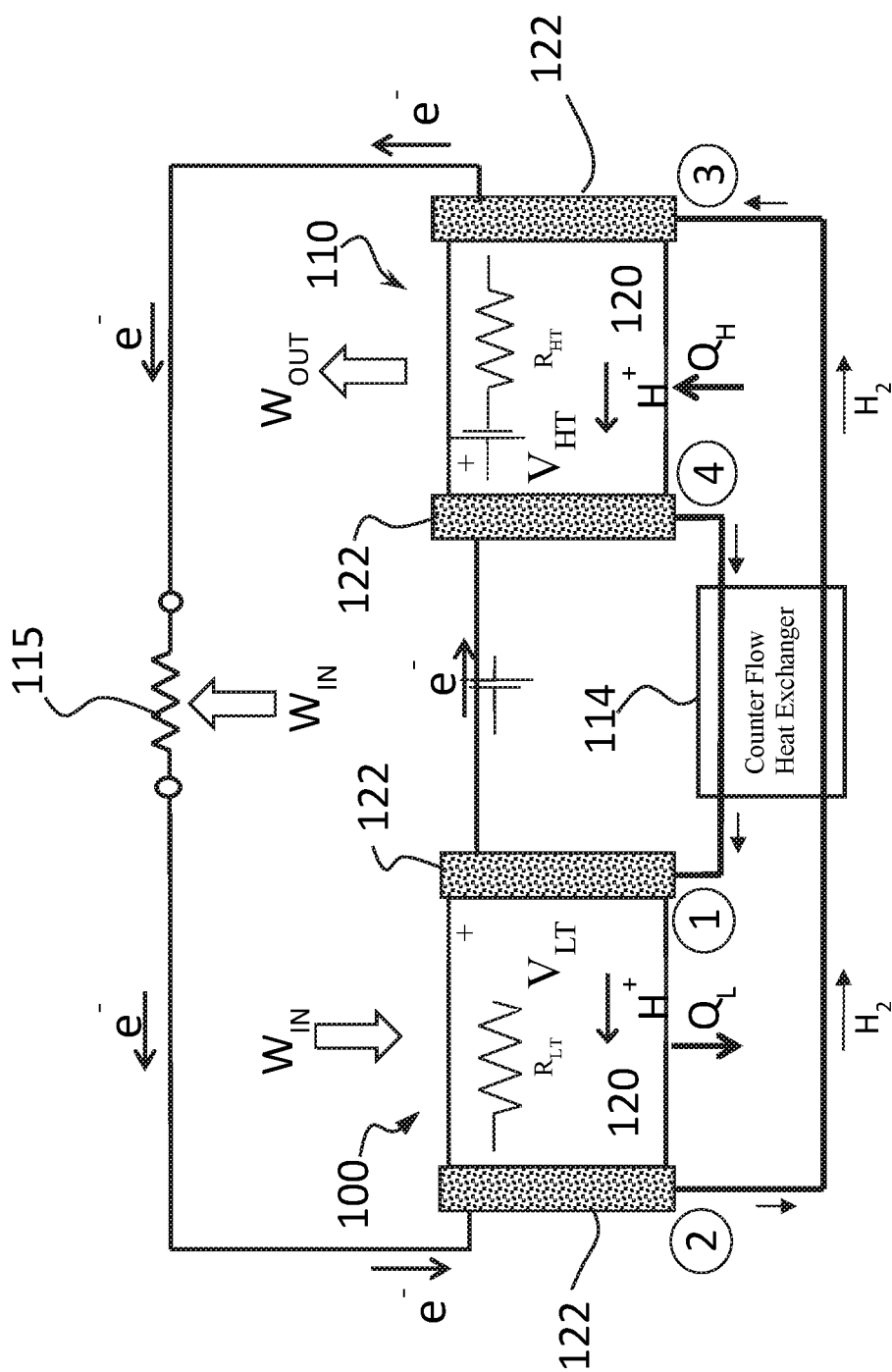
FIG. 3 is a diagram of the Ericsson thermodynamic cycle.

As illustrated in FIG. 3, each MEA 116, 118 can be represented as a voltage source and an internal resistance. In the example of FIG. 3, hydrogen is the working fluid. An electron current is directed to an external load 115 as electrons are stripped from the protons, thereby allowing the protons to pass through the proton conductive membranes 120. The higher voltage $V_{HT}$ of the higher temperature MEA 118 determines the direction of current flow by imposing a voltage across the lower temperature MEA 116 that exceeds the lower temperature MEA's Nernst potential $V_{LT}$. The higher Nernst voltage $V_{HT}$ of the higher temperature MEA 118 forces reverse current flow through the low temperature MEA 116, effectively charging the low temperature cell 100, i.e. forcing hydrogen from low pressure to high pressure as hydrogen expands from high pressure to low pressure through the high temperature MEA 118. In the low pressure side 1 of the low temperature MEA 116 and the high pressure side 3 of the high temperature MEA 118, hydrogen gas is oxidized resulting in the creation of protons and electrons. On the high pressure side 2 of the low temperature MEA 116 and the low pressure side 4 of the high temperature MEA 118, the protons are reduced with the electrons to reform hydrogen gas.

Ideally, the difference in voltage between the two MEAs 116, 118 or two MEA stacks is applied across the external load 115. The hydrogen enclosed in the JTEC heat engine circulates continuously inside the JTEC heat engine and is not consumed. Ideally, the hydrogen flow (electron current $e^-$ and proton current $H^+$) through both MEA stacks 116, 118 is the same. Representing the electron current flow as I, the power output by the high temperature cell ($V_{HT}*I$) is sufficient to drive the compression process in the low temperature cell 100 ($V_{LT}*I$) as well as supply net power output to an external load (($V_{HT}*I$)–($V_{LT}*I$)). The voltage differential provides the basis for the JTEC engine. As in any thermodynamic engine employing a working fluid and consistent with the nature of compressible gas, in the JTEC, a greater amount of work (electricity) is extracted during high temperature expansion than the work (electricity) input required for the low temperature compression.

Figure 4:
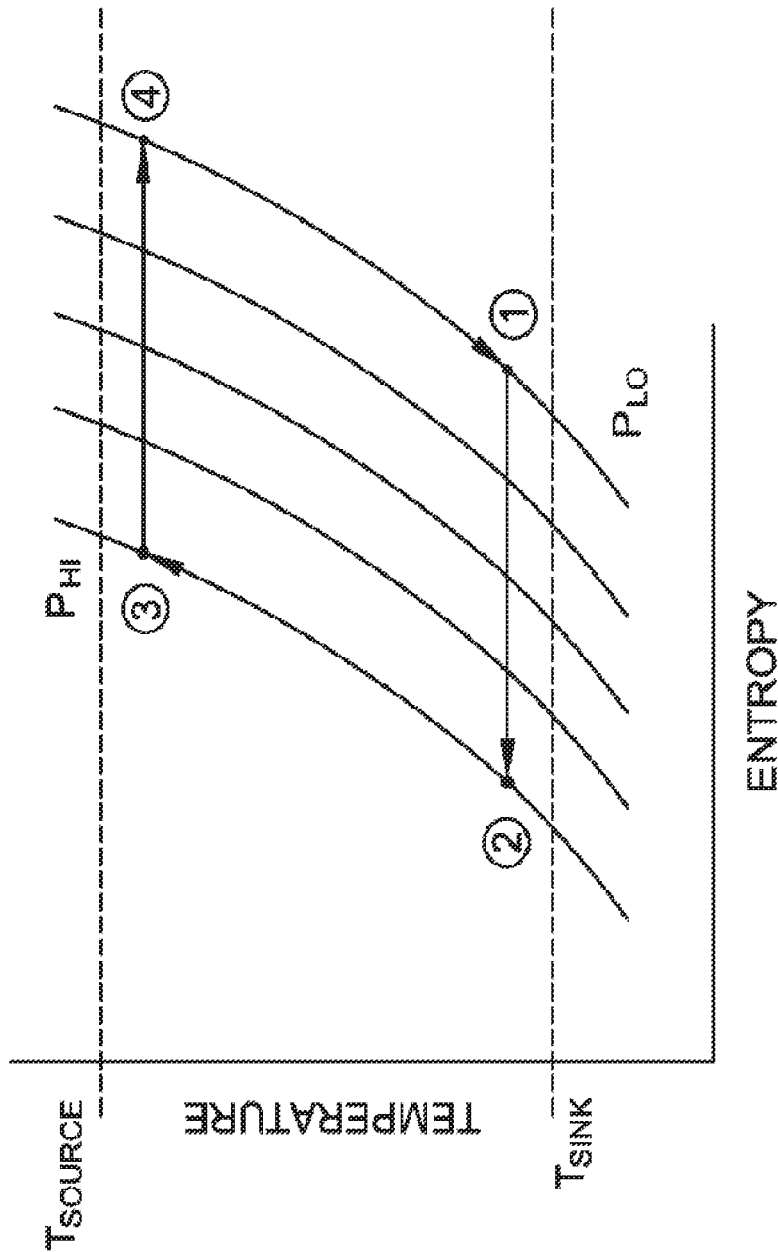
FIG. 4 is a schematic of the operating configuration of a Johnson Thermo-Electrochemical Converter.

The ideal JTEC operates on the Ericsson thermodynamic cycle, which is equivalent to the Carnot cycle. Referring to FIG. 4, there is shown the ideal temperature entropy diagram for the ideal Ericsson engine cycle. Reference numerals "1" through "4" in FIGS. 1, 3 and 4 represent the corresponding different thermodynamic states of the working fluid as it progresses through the cycle. As shown in FIG. 1, beginning at the low-temperature, low-pressure state 1, electrical energy $W_{in}$ is supplied to the low-temperature (first) MEA stack 116 in order to pump hydrogen from the low-temperature, low-pressure state 1 to the low-temperature, high-pressure state 2. The temperature of the hydrogen is maintained nearly constant by removing heat $Q_L$ from the proton conductive membranes 120 during the compression process. The membrane 120 is relatively thin (i.e., ideally on the order of 10 μm thick), and thus will not support a significant temperature gradient, so a near isothermal process is reasonable, provided adequate heat is transferred from the membrane 120 through its substrate.

From state 2, the hydrogen passes through the recuperative, counter flow heat exchanger 114 and is heated under approximately constant pressure to the high-temperature state 3. Ideally, the heat needed to elevate the temperature of the hydrogen from state 2 to 3 is transferred from hydrogen flowing in the opposite direction through the heat exchanger 114. At the high-temperature, high-pressure state 3, electrical power is generated as hydrogen expands across the high temperature (second) MEA stack 118 from the high-pressure, high-temperature state 3 to the low-pressure, high-temperature state 4. Heat $Q_H$ is supplied to the thin film membrane 120 to achieve a near constant temperature expansion process. From state 4 to state 1, the hydrogen flows through the recuperative heat exchanger 114, wherein its temperature is lowered under constant pressure by heat transfer to hydrogen passing from state 2 to 3. Upon leaving heat exchanger 114, the hydrogen is pumped by the low-temperature MEA stack 116 from state 1 back to high-pressure state 2 as the cycle continues.

Figure 5:
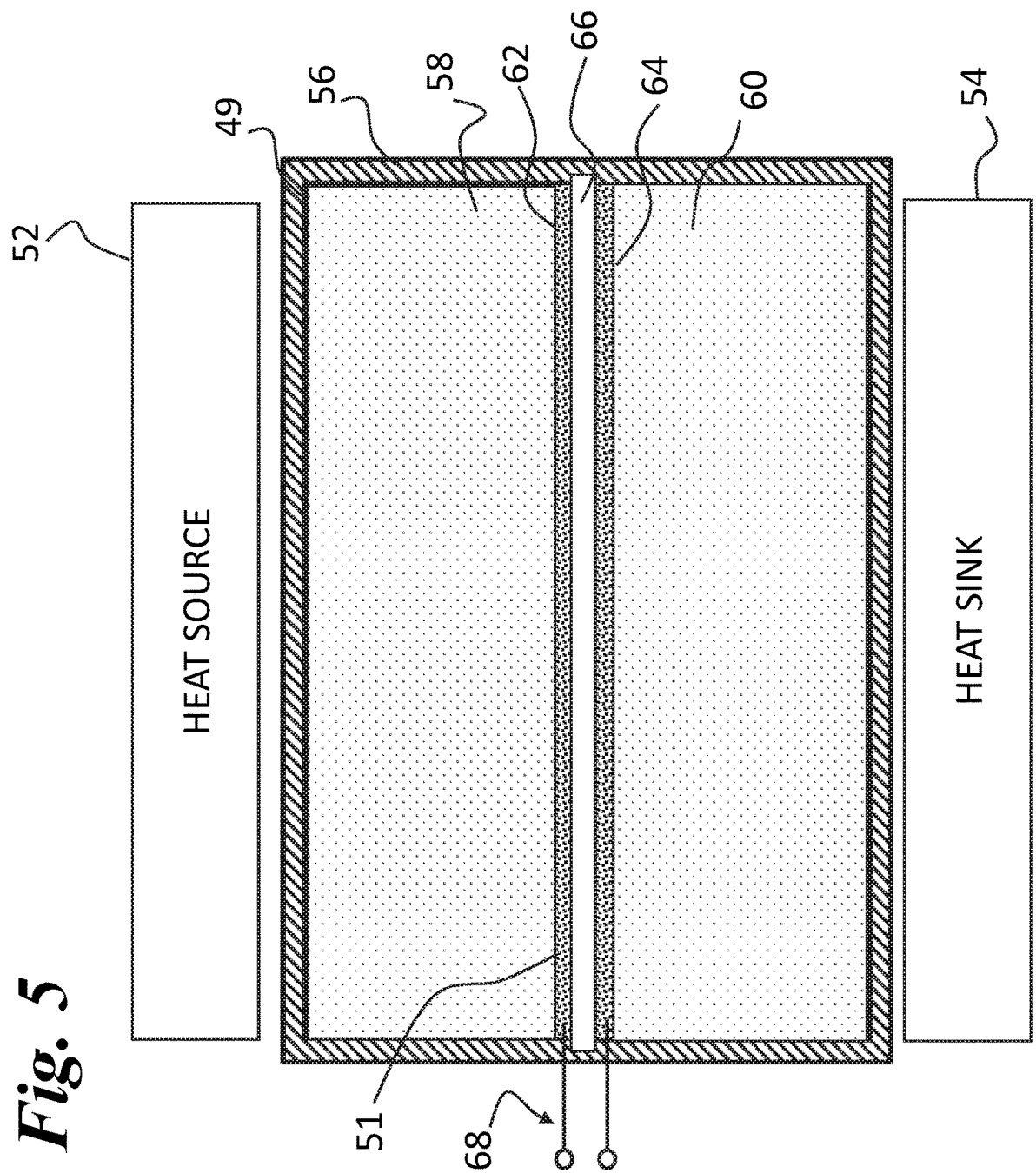
FIG. 5 is a diagram of an electrochemical direct heat to electricity converter including a membrane electrode assembly sandwiched by nano/micro porous material that functions as transpiration pump, in accordance with one embodiment of the present invention.

Referring to FIG. 5, there is shown an electrochemical direct heat to electricity converter in accordance with an embodiment of the present invention. Referring to FIG. 5, the converter comprises at least one electrochemical cell 49 which comprises at least one membrane electrode assembly 51 disposed within a housing or containment vessel 56. The MEA 51 is comprised of an ion conductive membrane 66 sandwiched between a first electrode 62 and a second electrode 64. The above discussion regarding the membrane and electrodes of the MEA represented in FIGS. 1-4 also applies to the MEAs of FIGS. 5-11.

The MEA 51 divides the containment vessel 56 into two separate volumes. Electrical terminals 68 extend into container 56 and are connected to the first and second electrodes 62 and 64 of the MEA 51. A micro/nano porous media 58, 60 is disposed within the containment vessel 56. The micro/nano porous media 58, 60 is thermally coupled between a heat source 52 and a heat sink 54. More particularly, within the containment vessel 56, the MEA 51 is sandwiched between a first volume of micro/nano porous media 58 and a second volume of micro/nano porous media 60 (hereinafter referred to as first porous media 58 and second porous media 60 for the sake of brevity). An elevated temperature heat source 52 is thermally coupled to the first porous media 58 on one side of the MEA 51 and a lower temperature heat sink 54 is thermally coupled to the second porous media 60 on the other side of the MEA 51. The working fluid (e.g., hydrogen or other suitable ionizable gas) is contained within the first and second porous media 58 and 60. The heat source 52 and the heat sink 54 produce a temperature gradient within the MEA 51, and more particularly within the first and second porous media 58 and 60. The temperature gradient, in turn, creates a transpiration pump effect resulting in a gas pressure differential across the MEA 51, and more particularly across the first electrochemical cell 49, in accordance with a Knudsen compressor effect.

The porous media 58, 60 may comprise any inherently porous electrode material or even a non-porous electrode material that is made porous by any known technique (e.g., cast a slurry of carbon/polymer on the material and subsequently remove the polymer). Examples of materials that may be used to form the porous media 58, 60 include, but are not limited to, carbon paper, fiber, cloth, foam and boards. Further examples of materials that may be used to form the porous media 58, 60 include, but are not limited to, porous ceramics that are made conductive through a known process, such as sputtering, via a solution reduction process (e.g., soak a porous ceramic in a solution such as silver nitrate and then heat at 500° C. to decompose to silver), or carbonization of a polymer (e.g., usually by heating at elevated temperatures greater than 100° C. while flowing inert gas.

Figure 6:
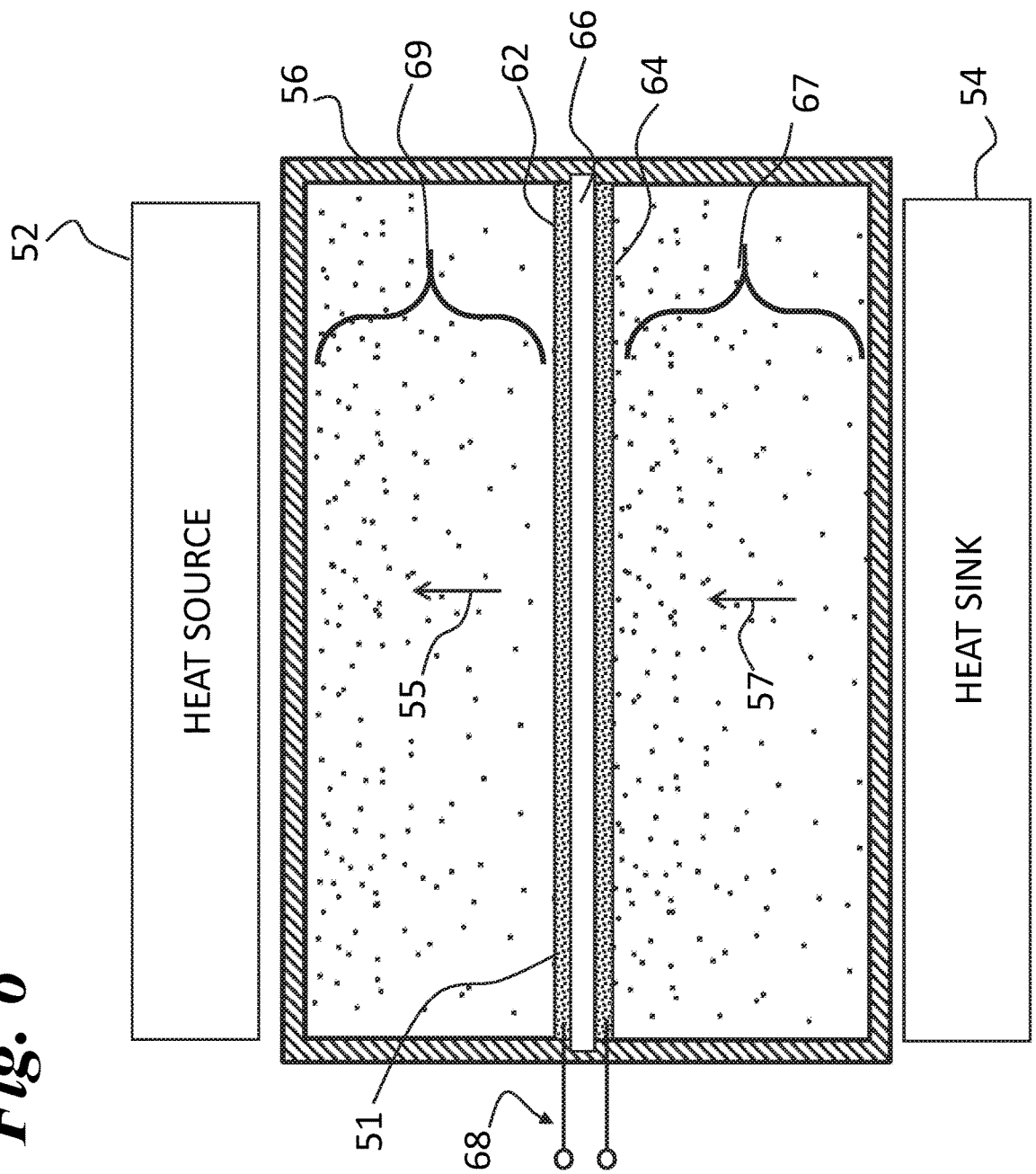
FIG. 6 is a diagram illustrating pressure gradients produced within the nano/micro porous material shown in FIG. 5.

FIG. 6 provides a visual depiction of the density, and thereby gas pressure gradients 67 and 69, across the first and second porous media 58, 60 resulting from the imposed temperature gradient across the micro/nano porous material of the first and second porous medial 58, 60 of the MEA 51. As illustrated by arrows 55 and 57, the ionizable gas within the first and second porous media 58, 60 tends to flow toward and create a higher pressure at the higher temperature regions of the first and second porous media 58, 60. Thus, the first and second nano/micro porous media 58, 60 function as transpiration pump, such as a Knudsen pump.

A Knudsen pump or compressor exploits thermal transpiration of a rarefied gas. The principle of thermal transpiration can be described in terms of an example of two volumes of gas at different temperatures T1 and T2 connected by a tube with a radius smaller than the mean free path (λ) of gas molecules. The behavior of this system depends on the Knudsen number (Kn≡λ/L, where L is a characteristic linear dimension of the tube). For Kn less than about 0.01 λ/L, the gas flows as a continuum; for Kn between about 0.01 and 10, the flow behavior of the gas is transitional between the continuum and free-molecular regimes; for Kn of about 10 or more, the flow regime is free-molecular. In the free-molecular regime, simple balancing of the equilibrium molecular fluxes leads to the following equation for the equilibrium pressures in the two volumes:

$$p1/p2 = (T1/T2)1/2 \qquad \text{Equation 1}$$

The mean free path of a gas depends upon its temperature and pressure as well as its molecular diameter. It is given by Equation 2:

$$\lambda = \frac{RT}{\sqrt{2}\,\pi d^2 N_A P} \qquad \text{Equation 2}$$

where P is pressure, T is temperature, d is the molecular diameter, $N_A$ is Avogadro's number and R is the universal gas constant. For hydrogen, d is approximately $2.89 \times 10^{-10}$ m.

A Knudsen compressor can be operated as a micro-scale pump or compressor over a pressure range from several atm down to about 10 mTorr. The critical components of Knudsen compressors are gas transport membranes, which can be formed from materials with randomized (porous) flow channels to densely packed parallel arrays of multiple individual flow channels. In the electrochemical direct heat to electricity converter according to the present invention, the first and second porous media 58, 60 serve as the gas transport membranes. An applied temperature gradient across a transport membrane creates a thermal creep pumping action. Porous membranes have been formed from aerogels, and arrays of individual microspheres. Multiple parallel flow channels, with lateral dimensions in the 100's of micrometer diameter range have also been investigated. These are formed by precision machining of aerogel for the larger diameters to in-situ assemblies of carbon nano-tubes. (Han, Yen-Lin; Alexeenko, Alina A.; Young, Marcus; and Muntz, Eric Phillip, "Experimental and Computational Studies of Temperature Gradient Driven Molecular Transport in Gas Flows through Nano/Micro-Scale Channels" (2007). School of Aeronautics and Astronautics Faculty Publications. Paper 5. http://dx.doi.org/10.1080/15567260701337209)

Referring to FIG. 6, as represented by the density of the dot patterns in the first and second porous media 58, 60, pressure gradients 67 and 69 result in a pressure differential across the MEA 51. The net result is a voltage output at the terminals 68 in accordance with the applied pressure differential and the temperature of the MEA 51 as defined by the Nernst equation.

Figure 7:
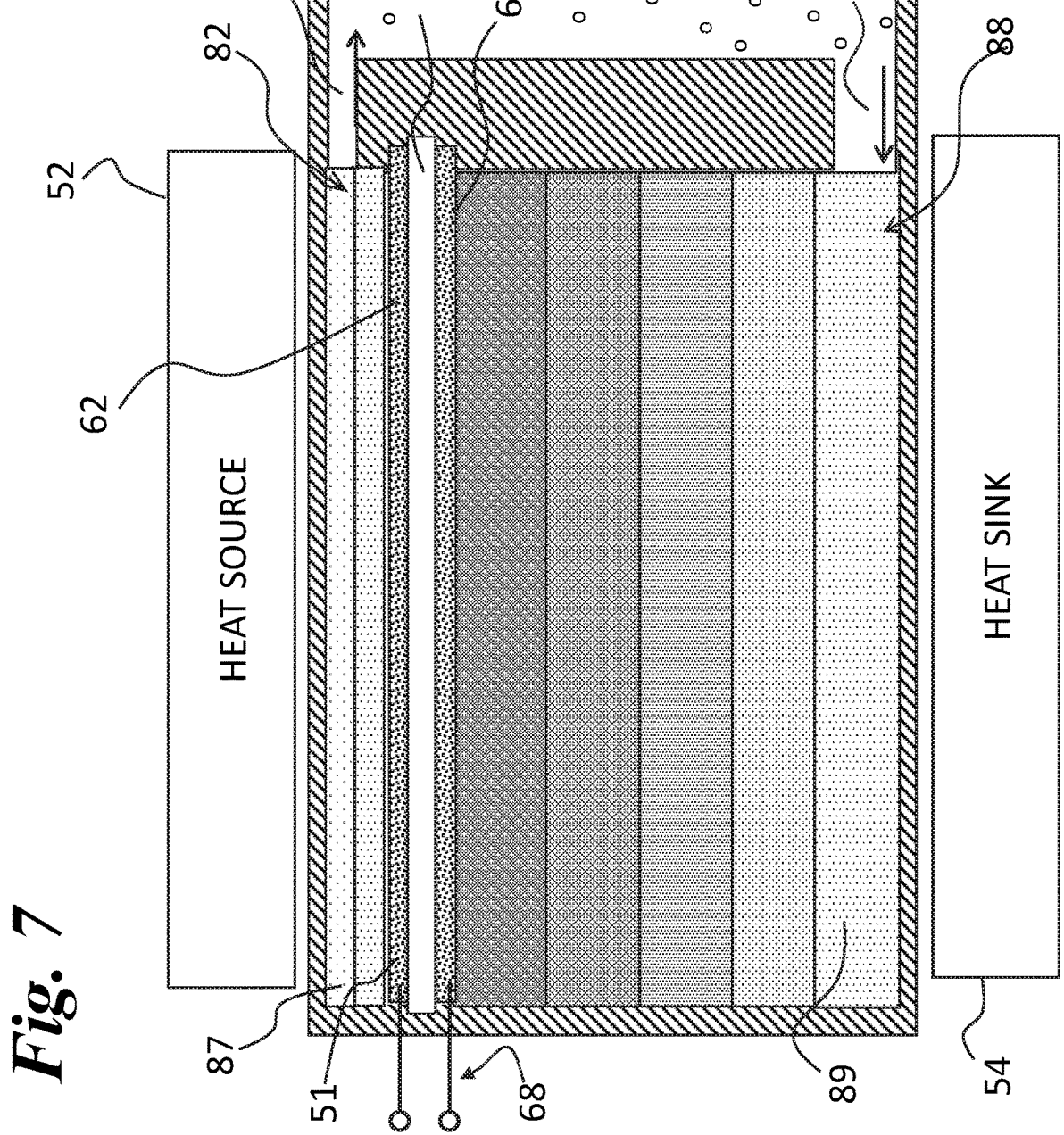
FIG. 7 is a diagram illustrating layers of nano/micro porous material having different levels of pore size and density sandwiching an electrode assembly within a housing that has a path for gas recirculation in an electrochemical direct heat to electricity converter, in accordance with one embodiment of the present invention.

FIG. 7 shows an example embodiment of another electrochemical direct heat to electricity converter according to the present invention, wherein the MEA 51 is shifted to a location closer to the heat source 52 and farther from the heat sink 54 (i.e., the distance between the MEA 51 and the heat source 52 is smaller than the distance between the MEA 51 and the heat sink 54), in order to provide higher MEA output voltage per the linear relationship with temperature, in accordance with the Nernst equation. This locational shift is achieved, for example, by the first volume of micro/nano porous media 82 being smaller dimensioned than the second volume of micro/nano porous media 88. Also, the containment vessel 96 is augmented in comparison to the vessel 56 shown in FIGS. 5-6, and more particularly is larger dimensioned, in order to include a return gas flow space or conduit 86. Due to the transpiration pumping effect generated within the first and second porous media 82, 88, the gas which flows under increased pressure into the region near the heat source 52 by the transpiration effect is free to flow to the low temperature region near the heat sink 54 through the open non-transpiration flow conduit 86 as illustrated by arrows 85.

In one embodiment, the first and second volumes of micro/nano porous transpiration media 58, 60 and 82, 88 may have graduated pore structures, wherein the pores are smaller in the regions of high pressure where the gas mean free paths are shorter and are larger in the regions of low pressure where the gas mean free paths of the gas are longer, so as to provide minimal restrictions to the gas flow. Ideally, the graduated pore structures provide a consistent Knudsen number relationship between pore size and gas molecule mean free path as the gas transitions across the porous media toward increasing pressure. Ideally, the transition in pore size would be a continuous gradient. Such an approach maintains Knudsen numbers (Kn) above about 10 $\lambda$/L to meet the transpiration requirements, but not by additional orders of magnitude so as to not unnecessarily restrict gas flow. Molecules with mean free paths on the order of microns are not constrained to flow through porous media having pore sizes on the order of nanometers, and thus the transition in pore size across the porous media is a continuous gradient and there is minimal resistance to the flow of gas across the porous media.

In a preferred embodiment of the configuration of FIG. 7, the pore size of the layer of micro/nano porous media 89 in the minimum temperature region nearest the heat sink 54 is smaller than the pore size of the layer of micro/nano porous media 87 in the maximum temperature region nearest the heat source 52. With rejection of heat Q as illustrated by arrow 83, the cooled gas 85 will enter the second porous media 88 near the temperature of the heat sink 54 and undergo transpiration pumping therein. Since the pressure of the gas as it leaves the layer of porous media 89 going upward through the second porous media 88 will be increased above the pressure of gas 85 leaving the layer of porous media 87, the net result is amplification of the pressure differential applied across the MEA 51. The effect of including the return flow conduit 86 is equivalent to having a multistage Knudsen transpiration pump. The pressure ratio created by such a pump is given by: $P_H/P_L = (T_H/T_L)n/2$, where n is the number of pumping stages. In this case, the number of pump stages, n is 2. (see: Naveen K Guptal, Seungdo An and Yogesh B Gianchandani; A Si-micromachined 48-stage Knudsen pump for on-chip vacuum; J. Micromech. Microeng. 22 (2012) 105026 (8 pp) doi:10.1088/0960-1317/22/10/105026).

Figure 8:
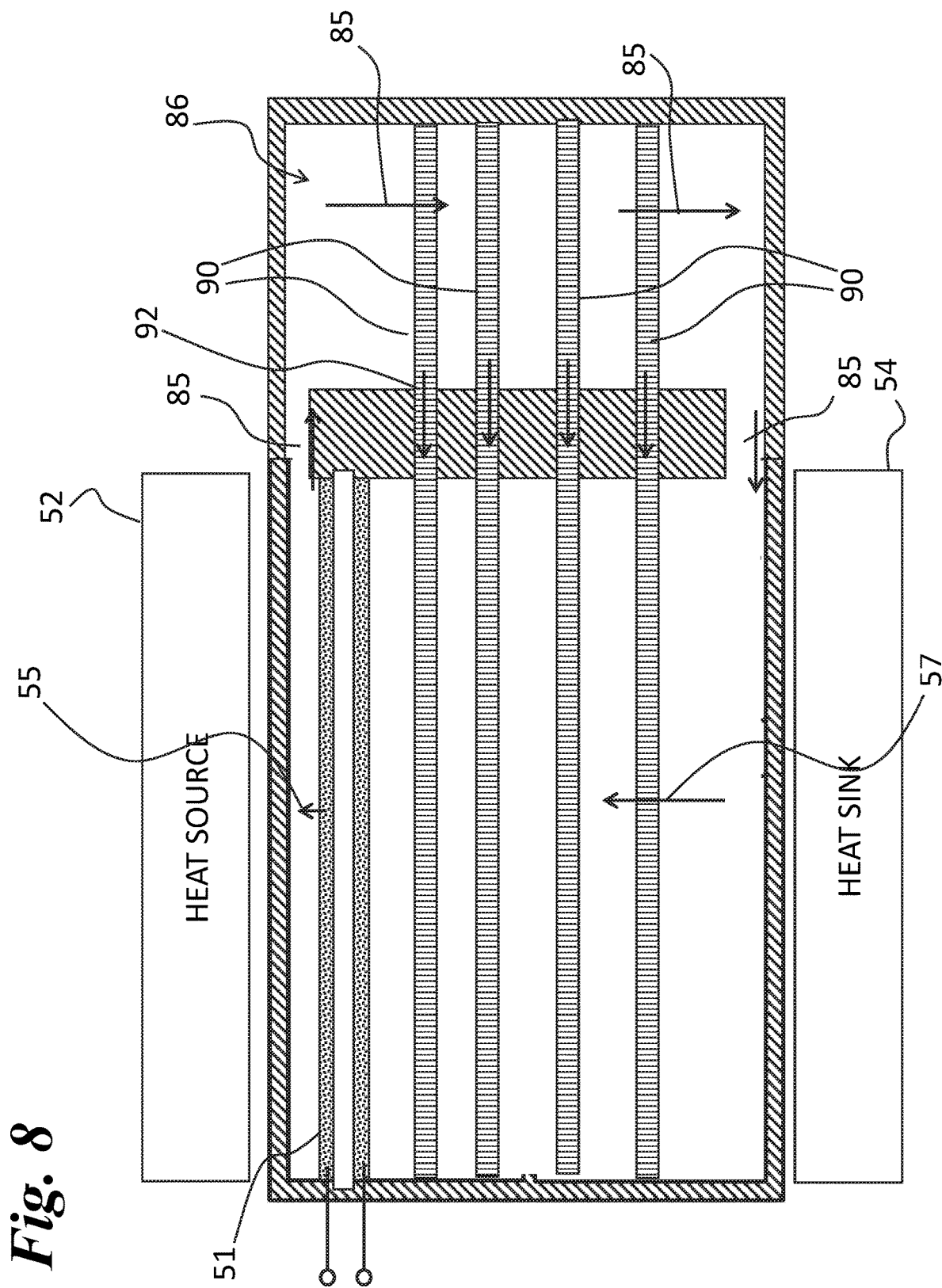
FIG. 8 is a diagram of an electrochemical direct heat to electricity converter including a layered structure of recuperative heat exchangers for recapturing heat from gas that is leaving the high temperature side and transferring it to gas that is flowing back to the high temperature side, in accordance with one embodiment of the present invention.

Referring to FIG. 8, there is shown another embodiment of an electrochemical direct heat to electricity converter according to the present invention. The MEA 51 shown in FIG. 8 includes a plurality of recuperative heat exchanger layers 90, in order to recover heat from gas leaving the high temperature region by transferring the heat to gas flowing back to the high temperature region. The recuperative heat exchanger layers 90 may be embedded within the porous media at spaced-apart positions, or may be arranged in an alternating manner with layers of the porous media. The porous media is not shown in FIG. 8 for ease of illustrating the recuperative heat exchanger layers 90. As opposed to rejecting the heat externally, as illustrated by arrow 83 in FIG. 7, the heat is transferred to the gas flowing within the transpiration media, as illustrated by arrows 92 in FIG. 8. The net effect is less waste heat rejected to the environment and, thereby, more efficient pumping.

Figure 9:
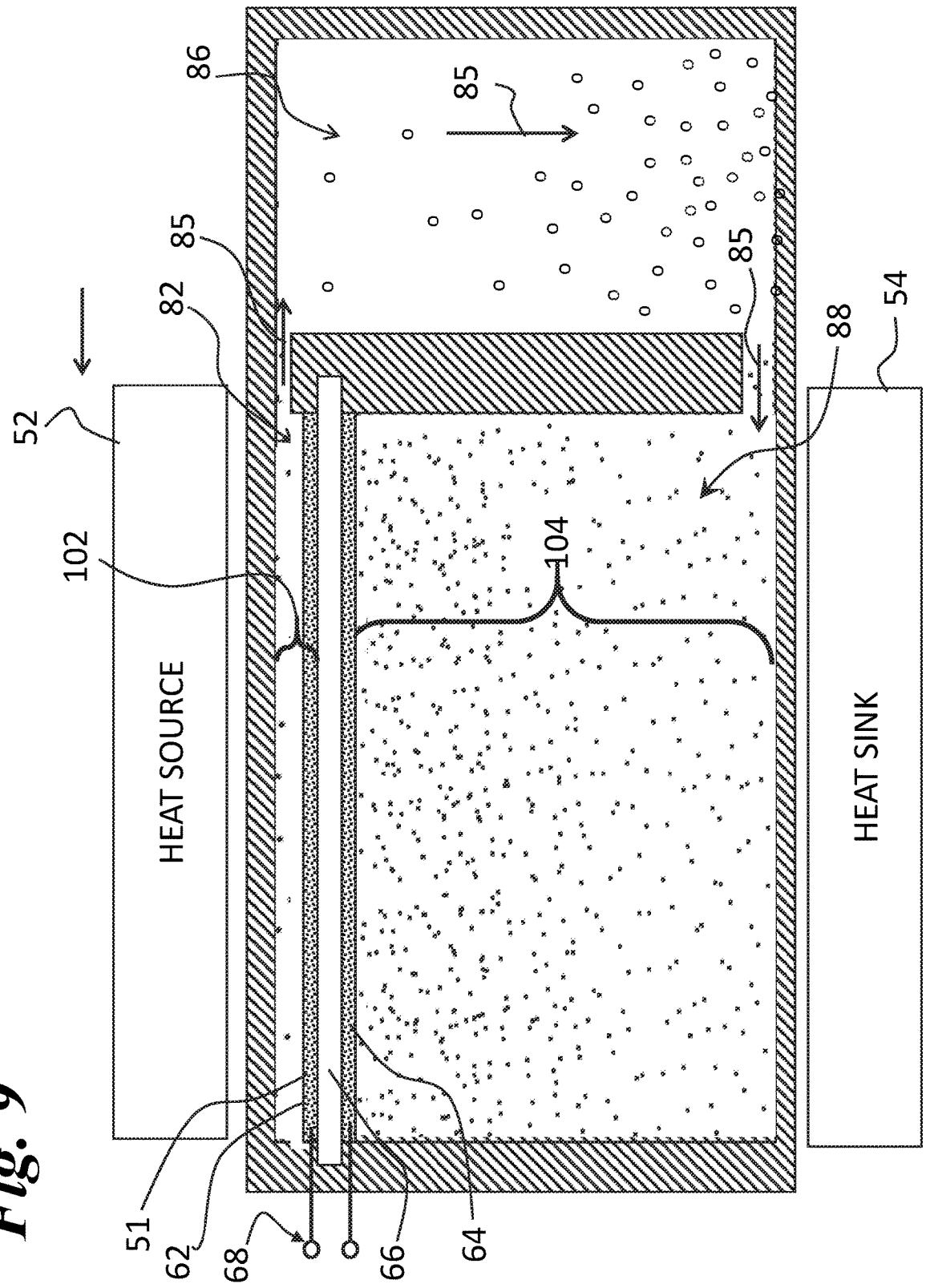
FIG. 9 is a diagram illustrating pressure gradients produced within the configuration of the electrochemical direct heat to electricity converter shown in FIG. 7.

FIG. 9 illustrates the density and thereby gas pressure gradients 102 and 104 across the first and second porous media 82, 88 resulting from the imposed temperature gradient in the MEA 51 of FIG. 7. Flow arrows 85 show the direction of flow motivated by the Knudsen pumping effect. The pressure in return flow conduit 86 is uniform whereas the transpiration pumping within the first and second micro/nano porous media 82 and 88 (see FIG. 7) creates well-defined gas pressure and density gradients. The density of gas in the return flow conduit 86 increases as its temperature is reduced as the gas gets closer to the low temperature heat sink 54.

Figure 10:
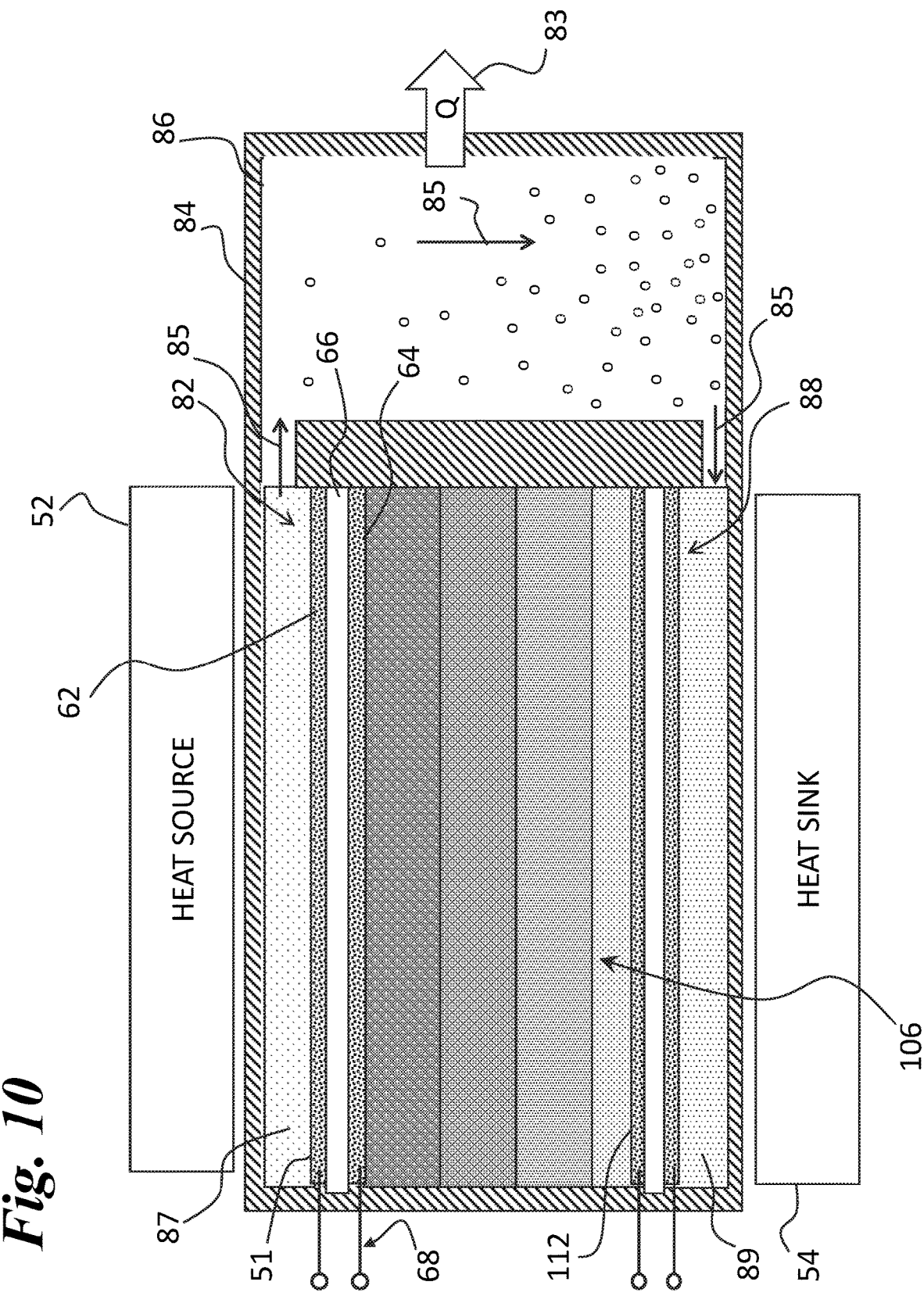
FIG. 10 is a diagram of an electrochemical direct heat to electricity converter including a second membrane electrode assembly for pumping hydrogen to the low temperature side of the converter, in accordance with one embodiment of the present invention.

Referring to FIG. 10, there is shown an altered embodiment of FIG. 7, wherein the electrochemical direct heat to electricity converter further includes a second MEA 112. The second MEA 112 is embedded within the second micro/nano porous media 88 near the heat sink 54, so that the second MEA 112 will operate at a lower temperature than the first MEA 51 proximate the heat source 52, and thereby at a lower voltage. The second MEA 112 functions as a low temperature compressor and supplies gas at an increased pressure to a portion 106 of the second micro/nano porous media 88 that couples gas flow between the second MEA 112 and the first MEA 51. The second MEA 112 is configured in the same manner as the first MEA 51 (an ion conductive membrane 66 sandwiched between a first electrode 62 and a second electrode 64).

Figure 11:
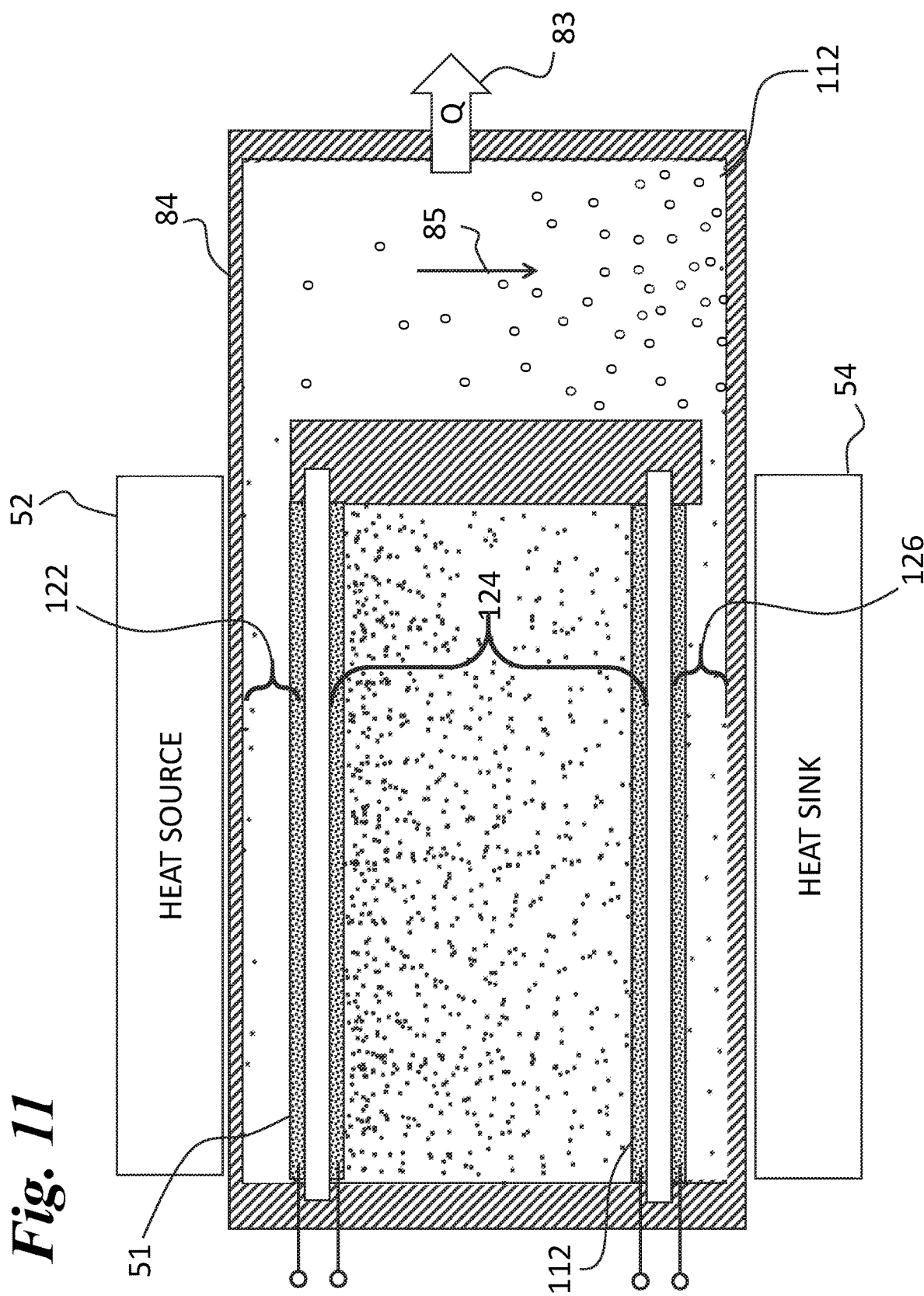
FIG. 11 illustrates the enhanced pressure gradients resulting from the configuration of the electrochemical direct heat to electricity converter shown in FIG. 10.

FIG. 11 shows the pressure and density distribution for the JTEC configuration shown in FIG. 10. The pressure gradients resulting from the transpiration pumping effect increases the pressure differential across the high temperature (first) MEA 51 while at the same time decreases the pressure differential across the low temperature (second) MEA 112. The configuration results in a higher net output voltage since the voltage difference between the low temperature MEA voltage and the high temperature MEA voltage will be greater than for a conventional JTEC that does not utilize the Knudsen pumping media. The pore structure of the electrodes of the MEAs can be designed for consistency with the micro/nano porous media for continuity of the transpiration pumping effect.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An electrochemical direct heat to electricity converter comprising:
    a working fluid;
    a housing;
    a heat source and a heat sink, the heat source being at an elevated temperature above a temperature of the heat sink;
    a first electrochemical cell disposed within the housing and comprising a first membrane electrode assembly across which the working fluid is configured to flow, the first membrane electrode assembly of the first electrochemical cell including a first porous electrode and a second porous electrode and at least one ion conductive membrane sandwiched between the first and second porous electrodes, the first electrochemical cell being arranged between the heat source and the heat sink; and
    a micro/nano porous media disposed within the housing, the working fluid being contained within the micro/nano porous media, the micro/nano porous media being thermally coupled between the heat source and the heat sink and creating a pressure differential across the first electrochemical cell by transpiration pumping of the working fluid.

2. The electrochemical direct heat to electricity converter of claim 1, wherein the working fluid is an ionizable gas.

3. The electrochemical direct heat to electricity converter of claim 2, wherein at least a portion of the micro/nano porous media includes graduated pore structures, and wherein pores of the graduated pore structures are smaller in regions of high pressure where gas mean free paths are shorter and are larger in regions of low pressure where gas mean free paths are longer.

4. The electrochemical direct heat to electricity converter of claim 3, wherein graduation in pore size is a continuous gradient.

5. The electrochemical direct heat to electricity converter of claim 2, wherein the micro/nano porous media includes a first section arranged between the heat sink and the first membrane electrode assembly and a second section arranged between the first membrane electrode assembly and the heat source.

6. The electrochemical direct heat to electricity converter of claim 5, wherein the first membrane electrode assembly is positioned closer to the heat source than the heat sink, such that the first electrochemical cell constitutes a high temperature side of the converter.

7. The electrochemical direct heat to electricity converter of claim 5, wherein a pore size of a minimum temperature region of the first section of nano/micro porous media proximate the heat sink is smaller than a pore size of a maximum temperature region of the second section of the nano/micro porous media proximate the heat source.

8. The electrochemical direct heat to electricity converter of claim 1, wherein the housing includes a return fluid conduit configured to allow working fluid under increased pressure due to transpiration pumping into a region proximate the heat source to flow into a region proximate the heat sink.

9. The electrochemical direct heat to electricity converter of claim 8, further comprising one or more recuperative heat exchangers positioned within the housing and configured to transfer heat from working fluid flowing in the return fluid conduit to working fluid flowing through the nano/micro porous media.

10. The electrochemical direct heat to electricity converter of claim 1, further comprising a second electrochemical cell disposed within the housing and comprising a second membrane electrode assembly across which the working fluid is configured to flow, the second membrane electrode assembly of the second electrochemical cell including a first porous electrode and a second porous electrode and at least one ion conductive membrane sandwiched between the first and second porous electrodes, the second electrochemical cell constituting a low temperature side of the converter and being arranged between the first electrochemical cell and the heat sink,
    wherein the micro/nano porous media creates a pressure differential across the second electrochemical cell by transpiration pumping.

\* \* \* \* \*